July 7, 1936.  C. J. DUNZWEILER  2,046,775
STORAGE BATTERY GRID
Filed Aug. 10, 1933
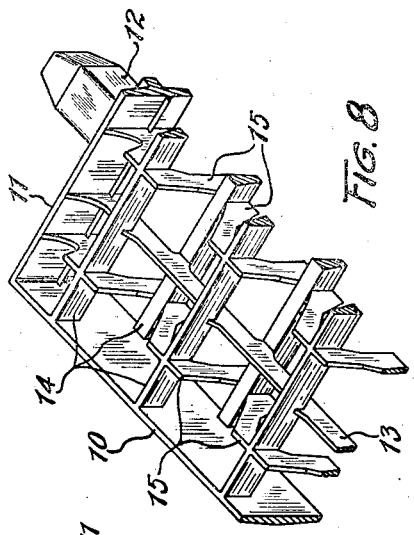
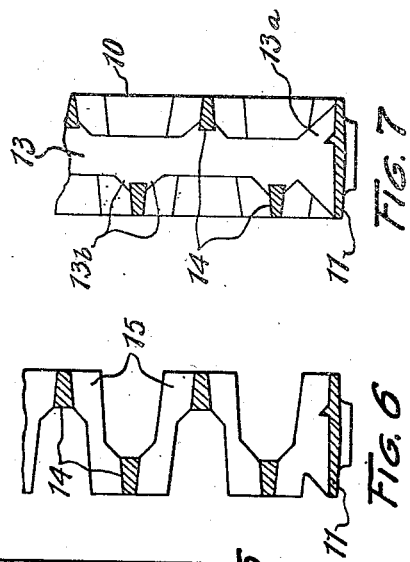
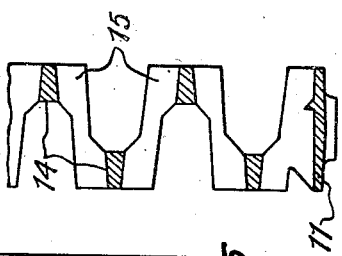
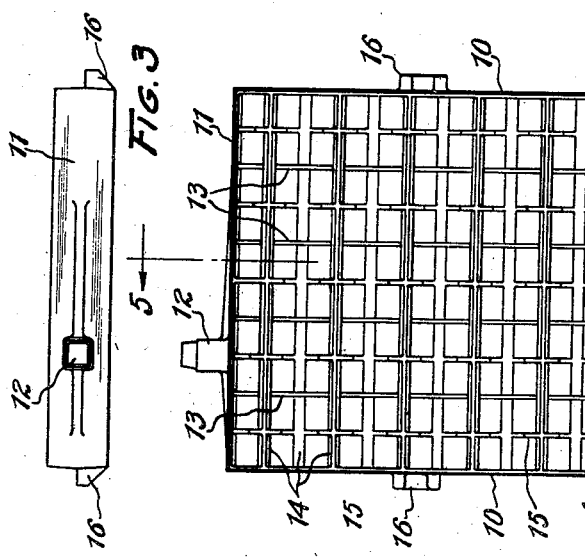
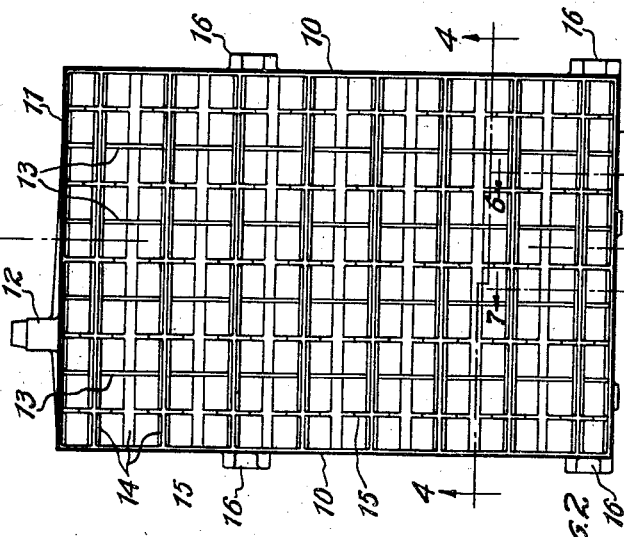
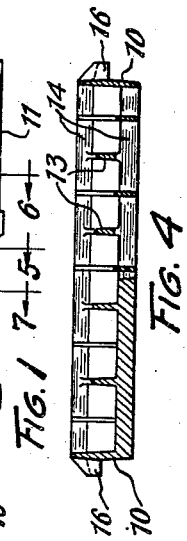
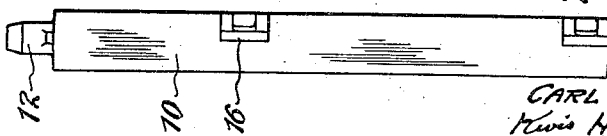
INVENTOR
CARL J. DUNZWEILER
Kwis Hudson & Kent
ATTORNEYS Patented July 7, 1936

2,046,775

UNITED STATES PATENT OFFICE 2,046,775

STORAGE BATTERY GRID

Carl J. Dunzweiler, Cleveland, Ohio, assignor to Willard Storage Battery Company, Cleveland, Ohio, a corporation of West Virginia Application August 10, 1933, Serial No. 684,510

9 Claims. (Cl. 136—51)

This invention relates to improvements in storage battery grids.

It has been discovered that a storage battery can be produced having certain desirable characteristics quite different from those of storage batteries heretofore in use. Among these desirable characteristics are low self-discharge or long shelf life, long period of serviceability, ability to deliver continuously low rates for exceptionally long periods of time or relatively high rates for short periods, smooth ampere-hour voltage characteristics, high efficiency from the standpoint of weight and space, or size of cell, and simplicity of construction.

These characteristics and other desirable ones are due in part to the grid and plate construction wherein the plate has a large amount of active material and wherein the ratio of lead to active material is low, i. e., wherein the percentage of lead is lower and the percentage of active material is higher than customary. It is in the construction of a suitable grid for this purpose that the present invention lies.

The principal object of this invention, therefore, is to provide a grid construction which accomplishes the results stated above, and especially to provide a grid which will have the requisite strength to accommodate and retain a large amount of active material in a very thick or deep plate compared with the height and width thereof.

A further object is to provide a grid construction wherein with substantially a minimum amount of lead there is provided a grid having ample strength to support the active material which in weight greatly exceeds the weight of the grid.

The above and other objects are attained by the present invention, which may be here briefly summarized as consisting in certain novel details of construction and combinations and arrangements of parts which will be described in the specification and set forth in the appended claims.

In the accompanying sheet of drawings, wherein I have shown an embodiment of my invention which operates with high efficiency, Fig. 1 is a face view or side elevation of my improved grid;

Fig. 2 is an edge view of the same;

Fig. 3 is a top view;

Fig. 4 is a transverse sectional view along the irregular line 4—4 of Fig. 1;

Fig. 5 is a vertical sectional view substantially along the line 5—5 of Fig. 1;

Fig. 6 is an enlarged fragmentary sectional view substantially along the line 6—6 of Fig. 1;

Fig. 7 is a similar view substantially along the line 7—7 of Fig. 1; and

Fig. 8 is a perspective view showing a portion of the grid only.

Referring now to the drawing, it will be observed that the grid has considerable depth compared with its height and width and that it has wide upright side walls 10 and wide top and bottom walls 11. From the top wall extends the usual post or lug 12. Extending between the top and bottom walls 11 of the grid are a series of equally spaced vertical ribs 13 located on the interior of the grid. These ribs are of considerably less depth than the grid (preferably less than one-third the depth) and are spaced uniform distances from the two opposite side surfaces. The upper and lower ends of these ribs where they join the top and bottom walls are tapered or flared outwardly to near the edges of the top and bottom walls, as shown at 13ª in Fig. 7.

Extending crosswise of the grid parallel to the top and bottom walls and located alternately adjacent the opposite outer sides of the grid are horizontal ribs 14 which also are of considerably less depth than the depth of the grid, these horizontal ribs 14 being in staggered relation and having their outer edges alternately flush with the opposite outer sides of the grid. They are preferably tapered in cross section, being thicker at their inner edges than at their outer edges, the shape being that of a small trapezium. Although these horizontal ribs are preferably of less depth than the vertical ribs 13 so that the inner edges of the horizontal ribs are spaced somewhat from the approximate edges of the vertical ribs 13, they are nevertheless joined to the vertical ribs, the junction being formed by providing on the vertical ribs tapered extensions 13ᵇ, (see particularly Fig. 7) which merge into the horizontal ribs, forming, of course, a continuous or integral construction. Not only are the vertical ribs 13 joined to the horizontal ribs 14 in the manner just explained, but they are joined together by zigzag members 15 which lie midway between the vertical ribs 13. These zigzag members extend to the opposite faces or surfaces of the grid where they are somewhat widened vertically and those between each pair of vertical ribs 13 or between the outermost vertical ribs 13 and the upright sides 10 lie in vertical planes spaced equally from the vertical ribs and outer side walls. In effect, they constitute additional vertical ribbing joined to the horizontal ribs 14 and to the top and bottom walls 11, but each of undulating form.

It will be noted that the upright side walls are provided with outwardly projecting lugs 16, two of which are arranged on opposite side walls near the bottom of the grid and two on the side walls near the top of the grid, the purpose of these lugs being to engage ribs or other projections on the walls of the container so that the container will be in supporting relation to the grids.

In the grid as shown in the drawing it will be noted that the vertical ribs 13 and the zig-zag members 15 are constructed as relatively thin, flat, substantially ribbon-like ribs, and are disposed in edgewise relation to the opposite faces or surfaces of the grid. As shown in the drawing the staggered horizontal ribs 14 are also relatively thin and more or less flattened and are disposed in edgewise relation to the opposite faces or surfaces of the grid.

With the construction explained above, a very deep grid is provided without requiring a large amount of lead, but, nevertheless, by the deep outer walls and by the arrangement of ribbing, the grid has ample strength to hold its shape and to support a relatively large amount of active material which, as usual, will be flush with the faces of the grid.

While I have described the preferred construction, changes may be made in the shape of the ribbing and in the position or number of the ribs without departing from the spirit of the invention, and I aim in my claims to cover all modifications or changes which do not involve a departure from the spirit and scope of the invention as set forth in the appended claims.

Having thus described my invention, I claim:

1. A grid comprising a frame composed of side and top and bottom walls of considerable depth, vertical ribs extending between the top and bottom walls, and horizontal ribs extending between the side walls, the vertical ribs being located on the interior of the grid and spaced from the opposite outer surfaces of the grid, while the horizontal ribs have outer edges substantially flush with the outer surfaces of the grid and inner edges lying between the grid surfaces, the inner edges of the horizontal ribs being in planes spaced outwardly from planes containing the upright edges of the vertical ribs but said inner edges of the horizontal ribs being connected at spaced points to said vertical ribs.

2. A grid comprising a frame of considerable depth having upright side walls and top and bottom walls, vertical ribs extending between the top and bottom walls and located interiorly of the grid, horizontal ribs extending between the side walls and inwardly to intermediate points between opposite side faces of the frame and arranged in two series, the ribs of each series having their outer edges substantially flush with one outer surface of the grid and vertically offset from the ribs of the other series, and zigzag ribbing lying in planes spaced between and substantially parallel to the planes of said vertical ribs, said ribbing directly joining a rib of one series to an immediately adjacent rib of the other series.

3. A grid comprising a substantially rectangular frame having side walls and top and bottom walls, vertical ribs extending between the top and bottom walls and located interiorly of the grid at a distance form the outer side surfaces, horizontal ribs of less depth than the depth of the grid and alternately flush with the opposite side surfaces of the grid, and vertical ribs between the first named vertical ribs and having portions flush with the opposite side surfaces of the grid and notched inwardly between the horizontal ribs.

4. A grid comprising a frame having considerable depth and composed of side walls and top and bottom walls, vertical ribs joining the top and bottom walls and of less depth than the grid and located interiorly thereof at a distance from the outer side surfaces, horizontal ribs extending between the side walls joined to the vertical ribs and also of less depth than the grid and in two series, the ribs of each of said series having their outer edges substantially flush with one outer side surface of the grid and vertically offset from the ribs of the other series, and diagonally disposed or zigzag members lying in planes spaced between and substantially parallel to the planes of said vertical ribs and having portions substantially flush with the outer side surfaces of the grid, said members directly joining a rib of one series to an immediately adjacent rib of the other series.

5. A grid comprising a frame of considerable depth having upright side walls and top and bottom walls, vertical ribs extending between the top and bottom walls, horizontal ribs extending between the side walls, said vertical ribs being relatively thin, substantially flat ribs disposed edgewise to the opposite surfaces of the grid and with their opposite edges spaced inwardly from the planes of said grid surfaces, said horizontal ribs being of less depth than the depth of the grid and being disposed on opposite sides of the vertical ribs and connected to the outer edges of the latter, and other vertical ribs disposed between the first mentioned vertical ribs and connected to said horizontal ribs, said other vertical ribs being relatively thin flat ribs lying in planes substantially parallel to said first mentioned vertical ribs, and being recessed adjacent each horizontal rib.

6. A grid comprising a frame of considerable depth having upright side walls and top and bottom walls, vertical ribs extending between the top and bottom walls, horizontal ribs extending between the side walls, said vertical ribs being relatively thin flat ribs disposed edgewise to the opposite surfaces of the grid and with their opposite edges spaced inwardly from the planes of the respective grid surfaces, said horizontal ribs being of less depth than the depth of the grid and disposed edgewise to the grid surfaces with their outer edges alternately flush with the opposite surfaces of the grid, and other vertical ribs disposed between the first mentioned vertical ribs and connected to said horizontal ribs, said other vertical ribs being relatively thin flat ribs lying in planes substantially parallel to said first mentioned vertical ribs and being recessed adjacent each horizontal rib.

7. A grid comprising a frame of considerable depth having upright side walls and top and bottom walls, vertical ribs extending between the top and bottom walls and located interiorly of the grid, a set of spaced horizontal ribs extending between said side walls on each face of the grid with the ribs of one set alternating with the ribs of the other set, and zig-zag ribbing between the vertical ribs and joined to the top and bottom walls and to the horizontal ribs, said vertical ribs, and said zig-zag ribbing being substantially flat and being disposed edgewise to the opposite faces of the grid.

8. A grid comprising a frame of considerable depth having upright side walls and top and bottom walls, vertical ribs extending between the top and bottom walls and located interiorly of the grid, a set of horizontal ribs extending between the side walls on each face of the grid with the ribs of one set in offset relation to the ribs of the other set, said horizontal ribs being of less depth than the depth of the grid and disposed edgewise to the outer faces of the grid with their outer edges substantially flush with said outer faces and their inner edges connected with said vertical ribs, and zig-zag ribbing between the vertical ribs and joined to the top and bottom walls and to the horizontal ribs, said vertical ribs and zig-zag ribbing being relatively thin and substantially flat and disposed edgewise to the opposite faces of the grid.

9. A grid comprising a frame of considerable depth having upright side walls and top and bottom walls, a set of horizontal ribs on each face of the grid extending between the side walls and with the ribs of one set in vertically offset relation to the ribs of the other set, said horizontal ribs being disposed edgewise to the outer faces of the grid and with the backs thereof lying in substantially parallel planes disposed on opposite sides of the central plane of the grid and said horizontal ribs being thicker at their backs than at their outer edges, vertical ribs connected to the top and bottom walls and extending between the sets of horizontal ribs with the opposite edges thereof connected to the backs of the horizontal ribs, and zig-zag ribbing between the vertical ribs and connected with the top and bottom walls and with the horizontal ribs with portions of the zig-zag ribbing substantially flush with the opposite faces of the grid, said vertical ribs and zig-zag ribbing being substantially flat and disposed edgewise to the opposite surfaces of the grid.

CARL J. DUNZWEILER.